United States Patent
Kim

(10) Patent No.: US 11,851,116 B2
(45) Date of Patent: Dec. 26, 2023

(54) ELECTRIC STEERING CONTROL APPARATUS AND CONTROL METHOD THEREOF

(71) Applicant: HYUNDAI MOBIS CO., LTD., Seoul (KR)

(72) Inventor: Tae Hong Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/752,071

(22) Filed: May 24, 2022

(65) Prior Publication Data

US 2022/0379953 A1 Dec. 1, 2022

(30) Foreign Application Priority Data

Jun. 1, 2021 (KR) .......................... 10-2021-0070949

(51) Int. Cl.
*B62D 5/04* (2006.01)
*B62D 6/04* (2006.01)

(52) U.S. Cl.
CPC .......... *B62D 5/0484* (2013.01); *B62D 5/0493* (2013.01); *B62D 6/04* (2013.01)

(58) Field of Classification Search
CPC ...... B62D 5/0484; B62D 5/0493; B62D 6/04; B62D 5/046; B62D 15/025; B62D 5/0481; B62D 5/04; B62D 6/002; B62D 5/0463
See application file for complete search history.

(56) References Cited

U.S. PATENT DOCUMENTS

| | | | |
|---|---|---|---|
| 2003/0114969 A1* | 6/2003 | Dominke | B62D 5/0493 701/41 |
| 2018/0127023 A1 | 5/2018 | Fuzes et al. | |
| 2020/0023887 A1 | 1/2020 | Sasaki et al. | |
| 2020/0331522 A1 | 10/2020 | Yamashita et al. | |

FOREIGN PATENT DOCUMENTS

| | | |
|---|---|---|
| EP | 1 332 083 B1 | 9/2010 |
| KR | 10-2017-0136765 A | 12/2017 |

OTHER PUBLICATIONS

KR 20140133161 A with English translation (Year: 2014).*
Extended European Search Report dated Sep. 9, 2022, in counterpart European Patent Application No. 22162898.5 (11 Pages in English).

* cited by examiner

*Primary Examiner* — Calvin Cheung
(74) *Attorney, Agent, or Firm* — NSIP Law

(57) ABSTRACT

An electronic steering control apparatus to which a redundancy system is applied and which includes a first position controller and a second position controller. When communication is established between the first and second position controllers, the first position controller controls the position of a first motor based on command steering angles $\theta_1$ and $\theta_2$ from a control unit and feedback steering angles $\theta_{m1}$ and $\theta_{m2}$ from the first motor and a second motor, and the second position controller controls the position of the second motor based on the command steering angles $\theta_1$ and $\theta_2$ from the control unit and the feedback steering angles $\theta_{m1}$ and $\theta_{m2}$ from the first motor and the second motor.

10 Claims, 4 Drawing Sheets

ELECTRIC STEERING CONTROL APPARATUS AND CONTROL METHOD THEREOF

CROSS-REFERENCE TO RELATED APPLICATION

This application claims priority from and the benefit of Korean Patent Application No. 10-2021-0070949, filed on Jun. 1, 2021, which is hereby incorporated by reference for all purposes as if set forth herein.

BACKGROUND

Field

Exemplary embodiments of the present disclosure relate to an electronic steering control apparatus and a control method thereof, and more particularly, to an electronic steering control apparatus which can remove offsets accumulated between two controllers of an MDPS (Motor Driven Power Steering) system dualized for autonomous driving, and a control method thereof.

Discussion of the Background

In general, an electronic steering control apparatus (e.g. MDPS system) for guaranteeing the stability of a steering state by reducing the steering force of a steering wheel is applied to a vehicle.

Recently, research has been conducted on the technology for an electronic steering control apparatus to which a redundancy system (i.e. fully redundant system) is applied, in order to prevent a control vacuum from occurring in a vehicle such as an autonomous vehicle, in which a driver's intervention is not conducted, and to secure the driver's safety by continuously maintaining a steering force even though a failure occurs.

However, when the redundancy system (i.e. fully redundant system) is introduced into the electronic steering control apparatus (e.g. MDPS system) for autonomous driving, one electronic steering control apparatus is controlled by two position controllers (first and second position controllers). In this case, as offsets between position control signals are accumulated, the control performance of the electronic steering control apparatus may be rather degraded to make it difficult to normally perform position control.

Furthermore, as the offsets are accumulated, vibration occurs in the electronic steering control apparatus (e.g. MDPS system). In this case, the vehicle may not move along a desired steering path. As a result, the autonomous driving may not be normally performed.

The related art of the present disclosure is disclosed in Korean Patent Application Publication No. 10-2017-0136765 published on Dec. 12, 2017, and entitled "Steering Control Apparatus and Steering Control Method, and Steering-State Determination Apparatus therefor."

SUMMARY OF THE INVENTION

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Various embodiments are directed to an electronic steering control apparatus which can remove offsets accumulated between two controllers of an MDPS (Motor Driven Power Steering) system dualized for autonomous driving, and a control method thereof.

In an embodiment, there is provided an electronic steering control apparatus to which a redundancy system is applied and which includes a first position controller and a second position controller. When communication is established between the first and second position controllers, the first position controller is configured to control the position of a first motor based on command steering angles $\theta_1$ and $\theta_2$ from a control unit and feedback steering angles $\theta_{m1}$ and $\theta_{m2}$ from the first motor and a second motor, and the second position controller is configured to control the position of the second motor based on the command steering angles $\theta_1$ and $\theta_2$ from the control unit and the feedback steering angles $\theta_{m1}$ and $\theta_{m2}$ from the first motor and the second motor.

When the communication is established between the first and second position controllers, the first position controller may calculate averages of the command steering angles $\theta_1$ and $\theta_2$ and the feedback steering angles $\theta_{m1}$ and $\theta_{m2}$, and control the position of the first motor according to the calculated average values, and the second position controller may calculate the averages of the command steering angles $\theta_1$ and $\theta_2$ and the feedback steering angles $\theta_{m1}$ and $\theta_{m2}$, and control the position of the second motor according to the calculated average values.

When the communication between the first and second position controllers is cut off, each of the first and second position controllers may check whether a motor control current is equal to or more than a first specific value, when a position control error value corresponding to a difference between the respective command steering angle and the respective feedback steering angle falls within a first specific range, may check whether the respective command steering angle, a yaw rate, and a lateral acceleration fall within a second specific range, when the motor control current is equal to or more than the first specific value, and may check whether the position control error value is actually equal to or less than a second specific value, when the respective command steering angle, the yaw rate, and the lateral acceleration fall within the second specific range.

Between the first and second position controllers, a corresponding position controller, in a state in which the position control error value is equal to or less than the second specific value is retained for a designated specific time, may reset all the position control error values which have been accumulated.

After resetting the accumulated position control error value, the corresponding position controller may gradually increase a control gain in a ramp up manner within a predetermined time.

The position control error value may be a position control error value filtered by considering an error which comes out of a control frequency due to momentary disturbance or an obstacle or pot hole on a road.

In an embodiment, there is provided a control method of an electronic steering control apparatus to which a redundancy system is applied and which includes a first position controller and a second position controller. The control method includes, when communication is established between the first and second position controllers: controlling, by the first position controller, the position of a first motor based on command steering angles $\theta_1$ and $\theta_2$ from a control unit and feedback steering angles $\theta_{m1}$ and $\theta_{m2}$ from the first motor and a second motor; and controlling, by the second position controller, the position of the second motor based on the command steering angles $\theta_1$ and $\theta_2$ from the control unit and the feedback steering angles $\theta_{m1}$ and $\theta_{m2}$ from the first motor and the second motor.

When the communication is established between the first and second position controllers, the first position controller may calculate averages of the command steering angles $\theta_1$ and $\theta_2$ and the feedback steering angles $\theta_{m1}$ and $\theta_{m2}$, and control the position of the first motor according to the calculated average values, and the second position controller may calculate the averages of the command steering angles $\theta_1$ and $\theta_2$ and the feedback steering angles $\theta_{m1}$ and $\theta_{m2}$, and control the position of the second motor according to the calculated average values.

The control method may further include, when the communication between the first and second position controllers is cut off: checking, by each of the first and second position controllers, whether a motor control current is equal to or more than a first specific value, when a position control error value corresponding to a difference between the respective command steering angle and the respective feedback steering angle falls within a first specific range, checking, by each of the first and second position controllers, whether the respective command steering angle, a yaw rate, and a lateral acceleration fall within a second specific range, when the motor control current is equal to or more than the first specific value; and checking, by each of the first and second position controllers, whether the position control error value is actually equal to or less than a second specific value, when the respective command steering angle, the yaw rate, and the lateral acceleration fall within the second specific range.

The control method may further include resetting, by a corresponding position controller of the first and second position controllers, all the position control error values which have been accumulated, the corresponding position controller retaining for a designated specific time the state in which the position control error value is equal to or less than the second specific value.

The control method may further include gradually increasing, by the corresponding position controller, a control gain in a ramp up manner within a predetermined time, after resetting the accumulated position control error value.

The position control error value may be a position control error value filtered by considering an error which comes out of a control frequency due to momentary disturbance or an obstacle or pot hole on a road.

In accordance with the embodiments of the present disclosure, the electronic steering control apparatus and the control method may remove offsets which are accumulated between the dualized MDPS systems, i.e. the two position controllers, thereby stably performing autonomous driving control.

Other features and aspects will be apparent from the following detailed description, the drawings, and the claims.

DETAILED DESCRIPTION OF THE ILLUSTRATED EMBODIMENTS

Figure 1:
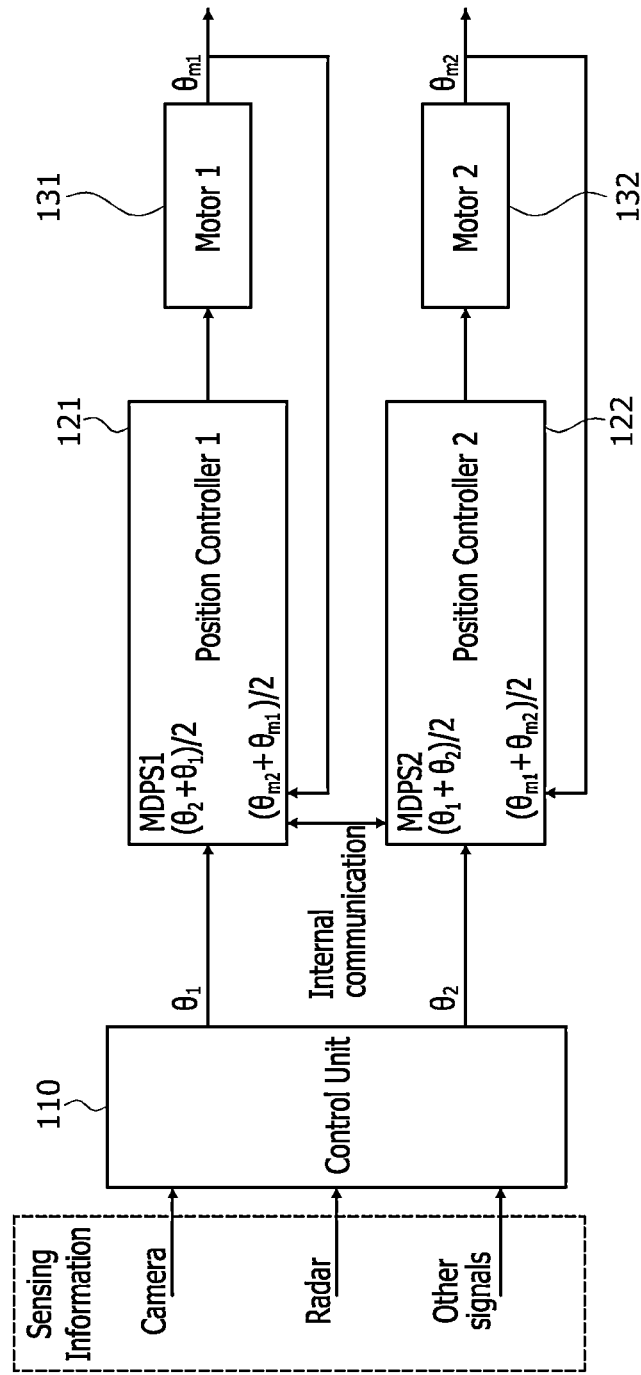
FIG. 1 is a diagram illustrating a schematic configuration of an electronic steering control apparatus in accordance with a first embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an electronic steering control apparatus and a control method thereof will be described below with reference to the accompanying drawings through various exemplary embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

FIG. 1 is a diagram illustrating a schematic configuration of an electronic steering control apparatus in accordance with a first embodiment of the present disclosure. That is, FIG. 1 is a diagram illustrating an electronic steering control apparatus (e.g. MDPS system) to which a redundancy system (i.e. fully redundant system) is applied.

As illustrated in FIG. 1, the electronic steering control apparatus in accordance with the first embodiment of the present disclosure includes a control unit 110, a first position controller 121, a second position controller 122, a first motor 131, and a second motor 132.

In general, an electronic steering control apparatus (e.g. MDPS system) to which a redundancy system (i.e. fully redundant system) is applied indicates an electronic steering control apparatus including two MDPS systems (or position controllers) 121 and 122.

Thus, when any one MPDS system (e.g. 121) fails, the other MDPS system (e.g. 122) may continuously perform steering control, such that autonomous driving or driver steering assistance can be continuously performed.

In the electronic steering control apparatus (e.g. MDPS system) to which the redundancy system (i.e. fully redundant system) is applied, command steering angles $\theta_1$ and $\theta_2$ applied from the control unit 110 and feedback steering angles $\theta_{m1}$ and $\theta_{m2}$ which the two MDPS systems (or position controllers) 121 and 122 sense from motors 131 and 132, respectively, in order to perform position control, need to ideally coincide with each other. In reality, however, the command steering angles $\theta_1$ and $\theta_2$ and the feedback steering angles $\theta_{m1}$ and $\theta_{m2}$ do not coincide with each other, but an offset occurs therebetween (see FIG. 4).

Thus, in order to solve such a problem that the offset occurs, the control unit 110 receives the command steering angles $\theta_1$ and $\theta_2$ and the feedback steering angles $\theta_{m1}$ and $\theta_{m2}$ through internal communication between the two MDPS systems (or position controllers) 121 and 122, calculates the averages of the command steering angles $\theta_1$ and $\theta_2$ and the feedback steering angles $\theta_{m1}$ and $\theta_{m2}$, and controls the positions of the motors by using the same values (e.g. the average values).

Thus, although the two MDPS systems (or position controllers) 121 and 122 have different command steering angles $\theta_1$ and $\theta_2$ and different feedback steering angles $\theta_{m1}$ and $\theta_{m2}$, the control unit 110 may calculate the average values in real time, and perform the position control by using the same values.

However, when a problem occurs in the internal communication between the two MDPS systems (or position controllers) 121 and 122, the communication may be disconnected, or an abnormal communication value may be acquired. The abnormal communication value may indicate that the command steering angles or the feedback steering angles come out of an error range.

Figure 2:
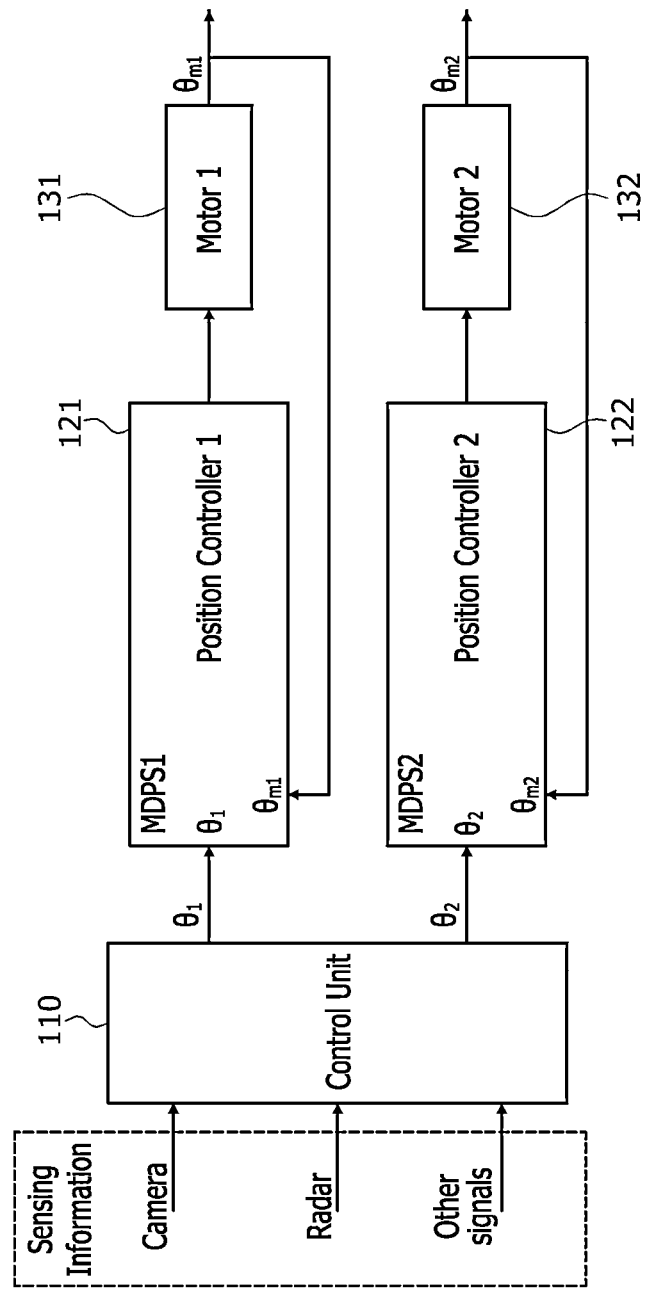
FIG. 2 is a diagram illustrating a schematic configuration of an electronic steering control apparatus in accordance with a second embodiment of the present disclosure.

FIG. 2 is a diagram illustrating a schematic configuration of an electronic steering control apparatus in accordance with a second embodiment of the present disclosure.

The electronic steering control apparatuses illustrated in FIGS. 1 and 2 are different from each other in that the two MDPS systems (or position controllers) 121 and 122 included in the electronic steering control apparatus illustrated in FIG. 1 are connected through internal communication, and two MDPS systems (or position controllers) 121 and 122 included in the electronic steering control apparatus illustrated in FIG. 2 have no internal communication therebetween.

When the two MDPS systems (or position controllers) 121 and 122 cannot perform internal communication therebetween as described above, the MDPS systems 121 and 122 may each perform control through a command steering angle and a feedback steering angle. In this case, offsets may be accumulated to result in control output saturation.

Figure 3:
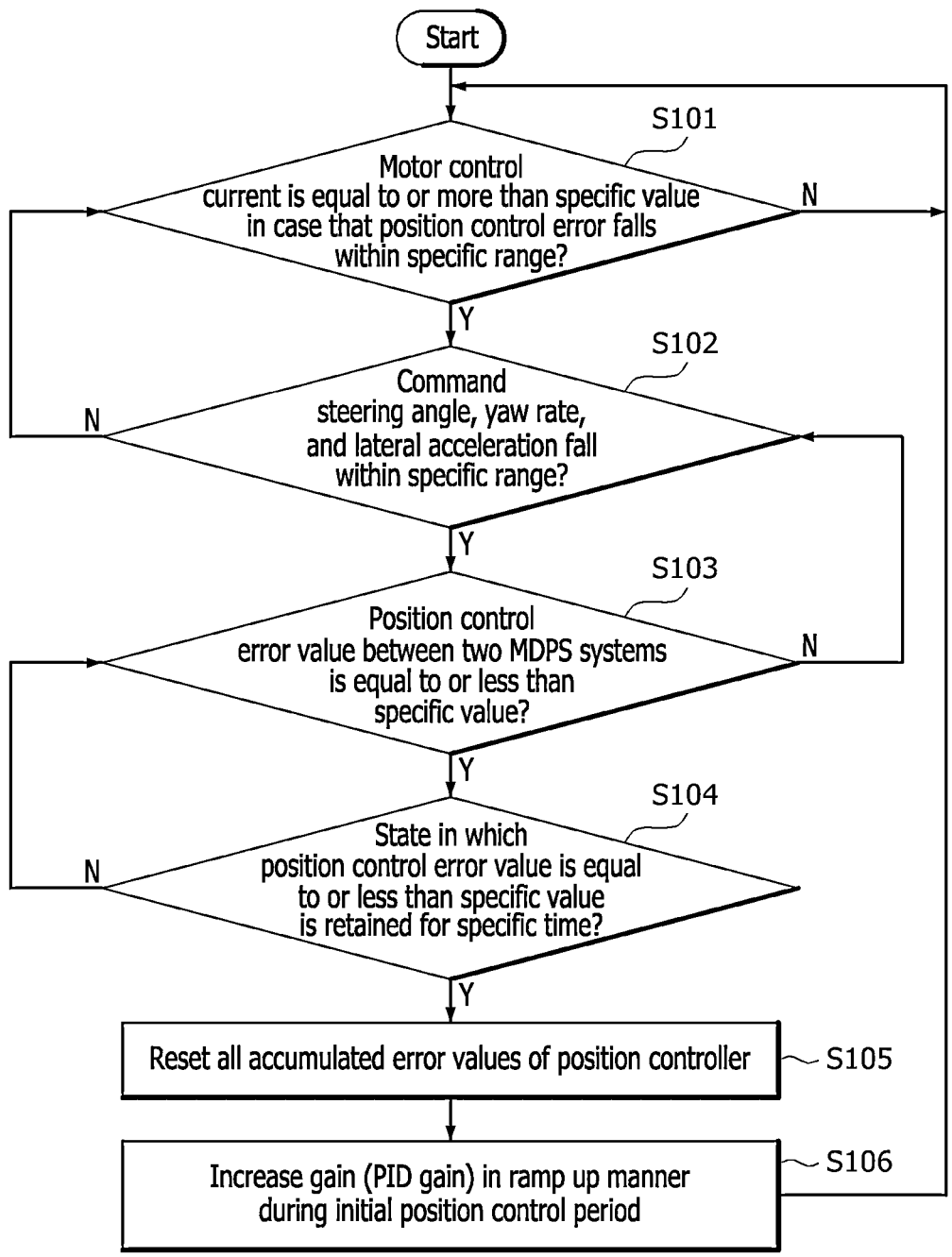
FIG. 3 is a flowchart for describing a control method of an electronic steering control apparatus in accordance with an embodiment of the present embodiment.

FIG. 3 is a flowchart for describing a control method of an electronic steering control apparatus in accordance with an embodiment of the present embodiment.

When the two MDPS systems (or position controllers) 121 and 122 cannot perform internal communication therebetween as described above, the MDPS systems (or position controllers) 121 and 122 each check whether a motor control current is equal to or more than a designated specific value (first specific value), in case that a position control error (i.e. a difference between a command steering angle and a feedback steering angle) falls within a designated specific range (first specific range), in step S101.

When the motor control current is high though a high control current is not needed because the command steering angle and the feedback steering angle have no difference therebetween, control output saturation is likely to have occurred. Thus, the MPDS systems 121 and 122 each check whether the motor control current is equal to or more than the designated specific value.

When the control output saturation is detected or the motor control current is equal to or more than the designated specific value (Yes in step S101), the corresponding MDPS system (position controller) 121 or 122 checks whether the command steering angle, a yaw rate, and lateral acceleration fall within a designated specific range (second specific range), in step S102.

This process is performed to determine whether the control current is not specifically required as in straight driving.

For example, when the yaw rate and the lateral acceleration are small values within the designated specific range (second specific range) while the command steering angle is around 0 degree, the MDPS system 121 or 122 may determine that the vehicle travels straight. When the vehicle travels straight, a very low control current is needed.

Therefore, when it is determined that the control current is a small value or the command steering angle, the yaw rate, and the lateral acceleration fall within the designated specific range (second specific range), the MDPS system 121 or 122 checks whether a position control error value between the MDPS systems 121 and 122 is equal to or less than a designated specific value (second specific value), in step S103.

That is, the MDPS system 121 or 122 checks once again whether the position control error value is equal to or less than the designated specific value (second specific value), while normally performing position control.

At this time, while there is no actual difference in the command steering angle and the feedback steering angle, an error out of the control frequency range may occur due to momentary disturbance or an obstacle or pot hole on a road. In this case, the MDPS system (or position controller) 121 or 122 removes an influence on offset calibration by filtering the position control error value.

When the state in which the position control error value is equal to or less than the designated specific value (second specific value) is retained for a designated specific time (Y in step S104), the MDPS system (or position controller) 121 or 122 may determine that a high control current is not required for autonomous driving control, and reset all the position control error values which have been accumulated so far, on the basis of such a state, or set the accumulated position control error value to 0, in step S105.

When a large change in control input occurs immediately after the accumulated position error value is set to 0, vibration or oscillation may be caused by a momentary change in control output while the control is not optimized and stabilized, because the linearity of the control or the accumulated position control error value of the position controller has forcibly been reset.

Thus, in order to prevent such a problem that vibration or oscillation may be caused by a momentary change in control output while the control is not optimized and stabilized, the MDPS system (or position controller) 121 or 122 gradually increases a control gain in a ramp up manner within a predetermined time during the next control period (i.e. the initial position control period) after resetting the accumulated position control error value, in step S106.

For example, when it is assumed that a P gain and an I gain of control gains in a PID controller are 10 and 5, respectively, 10 and 5 are not immediately applied, but the control gains are gradually increased to reach 10 and 5 for a designated time. Thus, although a momentary control change occurs, the final control output may be smoothly changed to reduce a sense of difference such as control oscillation or shock.

Figure 4:
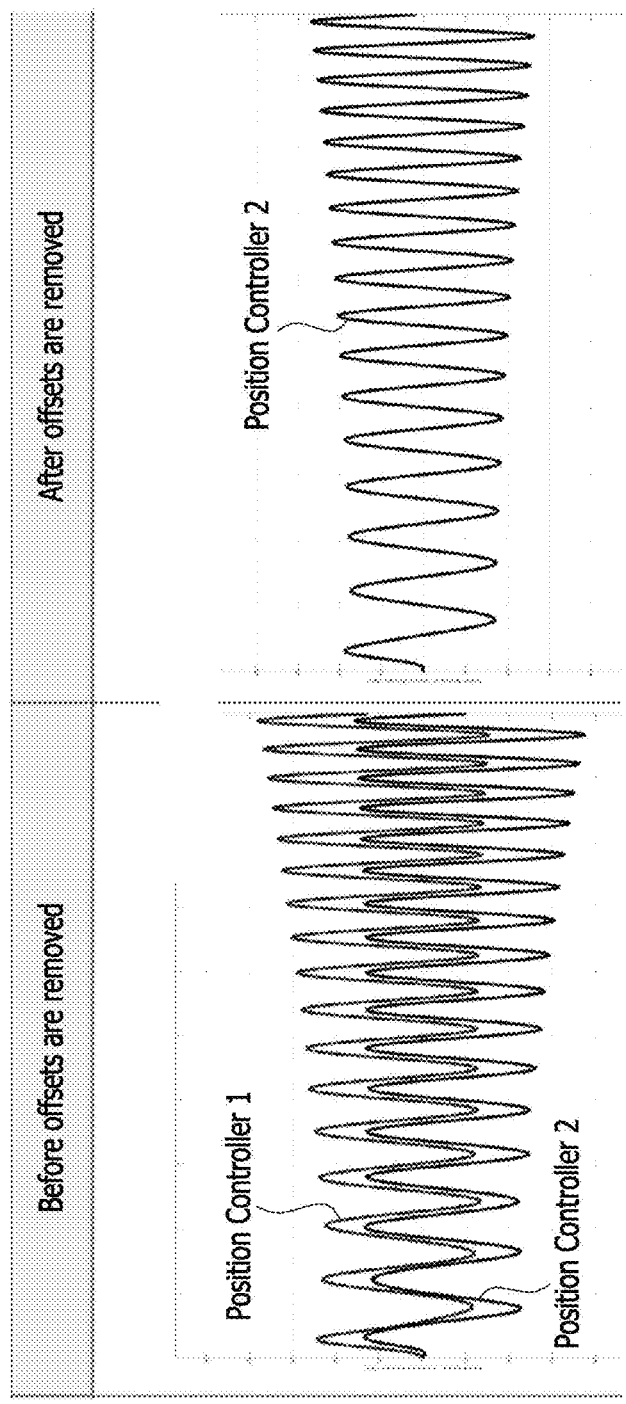
FIG. 4 is a diagram illustrating the forms of control signals before and after accumulated offsets are removed, in FIG. 1.

FIG. 4 is a diagram illustrating the forms of control signals before and after accumulated offsets are removed, in FIG. 1.

Referring to FIG. 4, the command steering angles and the feedback steering angles do not respectively coincide with each other, due to various factors such as the characteristics of sensors or CAN communication delay. Thus, as offsets which occur during position control are continuously accumulated, the control output may be saturated so that the position control is not normally performed as in the case of FIG. 4 before the offsets are removed. Thus, in the present embodiment, the electronic steering control apparatus removes offsets in response to the case in which the two MDPS systems (or position controllers) 121 and 122 can perform internal communication therebetween (see the descriptions of FIG. 1) and the case in which the two MDPS systems (or position controllers) 121 and 122 have no internal communication (see the descriptions of FIG. 3), respectively, as in the case of FIG. 4 after the offsets are removed. Then, the control output is not saturated while keeping the balance.

As described above, the electronic steering control apparatus and the control method in accordance with the present embodiments may remove offsets which are accumulated between the dualized MDPS systems, i.e. the two position controllers, thereby stably performing autonomous driving control.

Although the present disclosure has been described with reference to the embodiments illustrated in the drawings, the embodiments are only for illustrative purposes, and those skilled in the art will appreciate that various modifications and other equivalent embodiments are possible therefrom. Thus, the technical scope of the present disclosure should be defined by the following claims. Furthermore, the embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device, for example. The processor also includes a communication device, such as a computer, cellular phone, PDA (Personal Digital Assistant) and another device, which facilitates information communication between end users.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An electronic steering control apparatus to which a redundancy system is applied, comprising:
a first position controller and a second position controller,
wherein when communication is established between the first and second position controllers,
the first position controller is configured to control a position of a first motor based on command steering angles $\theta_1$ and $\theta_2$ from a control unit and feedback steering angles $\theta_{m1}$ and $\theta_{m2}$ from the first motor and a second motor, and
the second position controller is configured to control a position of the second motor based on the command steering angles $\theta_1$ and $\theta_2$ from the control unit and the feedback steering angles $\theta_{m1}$ and $\theta_{m2}$ from the first motor and the second motor, and
wherein when the communication between the first and second position controllers is cut off, each of the first and second position controllers is configured to:
check whether a motor control current is equal to or more than a first specific value, when a position control error value corresponding to a difference between the respective command steering angle and the respective feedback steering angle falls within a first specific range,
check whether the respective command steering angle, a yaw rate, and a lateral acceleration fall within a second specific range, when the motor control current is equal to or more than the first specific value, and
check whether the position control error value is equal to or less than a second specific value, when the respective command steering angle, the yaw rate, and the lateral acceleration fall within the second specific range.

2. The electronic steering control apparatus of claim 1, wherein when the communication is established between the first and second position controllers,
the first position controller is configured to calculate average values of the command steering angles $\theta_1$ and $\theta_2$ and the feedback steering angles $\theta_{m1}$ and $\theta_{m2}$, and to control the position of the first motor according to the calculated average values, and
the second position controller is configured to calculate the average values of the command steering angles $\theta_1$ and $\theta_2$ and the feedback steering angles $\theta_{m1}$ and $\theta_{m2}$, and to control the position of the second motor according to the calculated average values.

3. The electronic steering control apparatus of claim 1, wherein, between the first and second position controllers, a corresponding position controller, in a state in which the position control error value is equal to or less than the second specific value is retained for a designated specific time, is configured to reset all the position control error values which have been accumulated.

4. The electronic steering control apparatus of claim 3, wherein after resetting the accumulated position control error value, the corresponding position controller is configured to gradually increase a control gain in a ramp up manner within a predetermined time.

5. The electronic steering control apparatus of claim 3, wherein the position control error value is a position control error value filtered by considering an error that comes out of a control frequency due to momentary disturbance or an obstacle or pot hole on a road.

6. A control method of an electronic steering control apparatus to which a redundancy system is applied and which comprises a first position controller and a second position controller, the control method comprising:
when communication is established between the first and second position controllers:
controlling, by the first position controller, the position of a first motor based on command steering angles $\theta_1$ and $\theta_2$ from a control unit and feedback steering angles $\theta_{m1}$ and $\theta_{m2}$ from the first motor and a second motor; and
controlling, by the second position controller, the position of the second motor based on the command steering angles $\theta_1$ and $\theta_2$ from the control unit and the feedback steering angles $\theta_{m1}$ and $\theta_{m2}$ from the first motor and the second motor, and when the communication between the first and second position controllers is cut off:

checking, by each of the first and second position controllers, whether a motor control current is equal to or more than a first specific value, when a position control error value corresponding to a difference between the respective command steering angle and the respective feedback steering angle falls within a first specific range, checking, by each of the first and second position controllers, whether the respective command steering angle, a yaw rate, and a lateral acceleration fall within a second specific range, when the motor control current is equal to or more than the first specific value; and checking, by each of the first and second position controllers, whether the position control error value is equal to or less than a second specific value, when the respective command steering angle, the yaw rate, and the lateral acceleration fall within the second specific range.

7. The control method of claim 6, wherein, when the communication is established between the first and second position controllers, the first position controller calculates averages of the command steering angles $\theta_1$ and $\theta_2$ and the feedback steering angles $\theta_{m1}$ and $\theta_{m2}$, and controls the position of the first motor according to the calculated average values, and the second position controller calculates the averages of the command steering angles $\theta_1$ and $\theta_2$ and the feedback steering angles $\theta_{m1}$ and $\theta_{m2}$, and controls the position of the second motor according to the calculated average values.

8. The control method of claim 6, further comprising resetting, by a corresponding position controller of the first and second position controllers, all the position control error values which have been accumulated, the corresponding position controller retaining for a designated specific time the state in which the position control error value is equal to or less than the second specific value.

9. The control method of claim 8, further comprising gradually increasing, by the corresponding position controller, a control gain in a ramp up manner within a predetermined time, after resetting the accumulated position control error value.

10. The control method of claim 8, wherein the position control error value is a position control error value filtered by considering an error which comes out of a control frequency due to momentary disturbance or an obstacle or pot hole on a road.

* * * * *